United States Patent [19]

Shoemaker

[11] 4,045,126
[45] Aug. 30, 1977

[54] TWO-ELEMENT MICROSCOPE OBJECTIVE

[75] Inventor: Arthur H. Shoemaker, East Aurora, N.Y.

[73] Assignee: American Optical Corporation, Southbridge, Mass.

[21] Appl. No.: 699,277

[22] Filed: June 24, 1976

[51] Int. Cl.[2] .............................................. G02B 21/02
[52] U.S. Cl. ............................. 350/175 ML; 350/230
[58] Field of Search ....................... 350/175 ML, 230

[56] References Cited

U.S. PATENT DOCUMENTS

| | | | |
|---|---|---|---|
| 3,176,583 | 4/1965 | Klein | 350/175 ML |
| 3,355,234 | 11/1967 | Muller | 350/175 ML |

*Primary Examiner*—John K. Corbin
*Assistant Examiner*—Conrad Clark
*Attorney, Agent, or Firm*—Alan H. Spencer; William C. Nealon; H. R. Berkenstock, Jr.

[57] ABSTRACT

A two-element objective having a numerical aperture of 0.10 in combination with a telescope objective as described in U.S. Pat. No. 3,355,234 and a typical 10× eyepiece has a magnification of 4× and a substantially flat 24mm image field.

2 Claims, 1 Drawing Figure

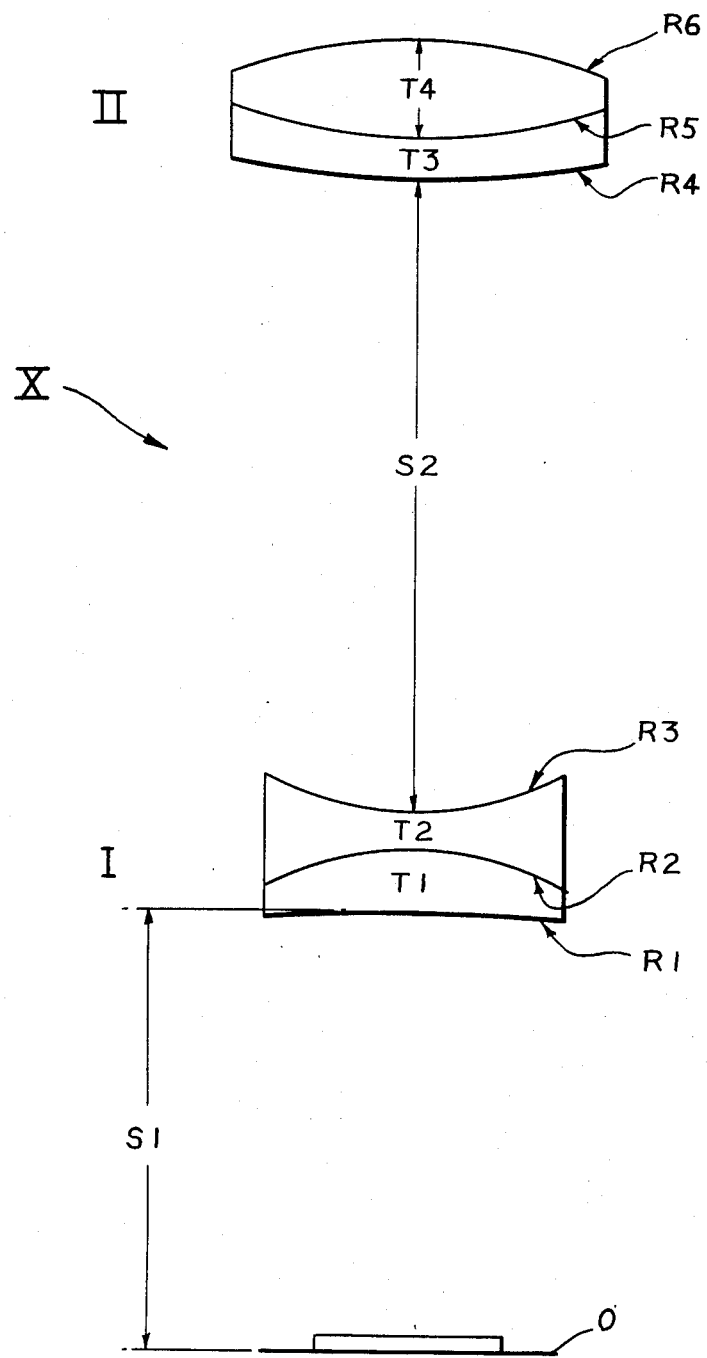

TWO-ELEMENT MICROSCOPE OBJECTIVE

BACKGROUND OF THE INVENTION

This invention relates to microscope objectives, and more particularly, to an achromatic microscope objective with a numerical aperture of substantially 0.10 having two components. It is an object of this invention to provide such a microscope objective which is well-corrected for the usual chromatic image aberrations as well as spherical aberrations, coma and astigmatism, while providing a substantially flat image field of 24mm and a 4× magnification in combination with a telescope objective as described in U.S. Pat. No 3,355,234 and a typical 10× eyepiece.

The most pertinent prior art known to the Applicant in U.S. Pat. No. 3,176,583 issued Apr. 6, 1954 to W. Klein. FIG. 1 of the noted patent is directed to a wide field objective having two lens elements of the same general configuration as those claimed herein. The present invention distinguishes over this reference in the specific values of the optical components constituting the objective.

DRAWING AND THE INVENTION

The drawing is an optical diagram of a microscope objective X having lens elements I and II in optical alignment along an optical axis extending from object plane O.

The first element I is a biconcave negative doublet and the second element II is a biconvex positive doublet. The parameters of objective X are set forth in Table I wherein the axial thicknesses of successive lens elements are designated $T_1$ to $T_4$, and the successive axial spaces from the object plane O are designated $S_1$ to $S_2$. Successive lens radii are designated $R_1$ to $R_6$ where the minus sign (−) applies to surfaces whose center of curvature lies on the object side of their vertices. The refractive indices and Abbe numbers of the glasses in the successive lenses are absolute values and designated $ND_1$ to $ND_4$ and $\nu_1$ to $\nu_4$, respectively.

TABLE I

| Lens | Radius (R) | Thickness (T) | Spacing (S) | Index of Refraction (ND) | Abbe No. ($\nu$) |
|---|---|---|---|---|---|
|   |                  |                |  $S_1 = .24167B$ |                     |                    |
|   | $R_1 = -4.36334B$ |                |                |                     |                    |
|   |                  | $T_1 = .04651B$ |                | $1.77 < ND_1 < 1.79$ | $\nu_1 \approx 25$ |
| I | $R_2 = -.25721B$ |                |                |                     |                    |
|   |                  | $T_2 = .04070B$ |                | $1.51 < ND_2 < 1.53$ | $\nu_2 \approx 64$ |
|   | $R_3 = .27059B$  |                |                |                     |                    |
|   |                  |                | $S_2 = .48271B$ |                     |                    |
|   | $R_4 = .96467B$  |                |                |                     |                    |
|   |                  | $T_3 = .04070B$ |                | $1.77 < ND_3 < 1.79$ | $\nu_3 \approx 25$ |
| II | $R_5 = .42024B$ |                |                |                     |                    |
|   |                  | $T_4 = .07558B$ |                | $1.48 < ND_4 < 1.50$ | $\nu_4 \approx 70$ |
|   | $R_6 = -.39640B$ |                |                |                     |                    | wherein B is 41 to 45mm.

A specific embodiment of the present invention is an objective wherein B is equal to 43mm and has the values set forth in Table II wherein radii, thicknesses and spacings are in millimeters.

TABLE II

| Lens | Radius (R) | Thickness (T) | Spacing (S) | Index of Refraction (ND) | Abbe No. ($\nu$) |
|---|---|---|---|---|---|
|   |                   |              | $S_1 = 10.3914$ |                |                  |
|   | $R_1 = -187.620$  |              |              |                |                  |
|   |                   | $T_1 = 2.000$ |              | $ND_1 = 1.78446$ | $\nu_1 = 25.74$ |
| I | $R_2 = -11.060$   |              |              |                |                  |
|   |                   | $T_2 = 1.750$ |              | $ND_2 = 1.51867$ | $\nu_2 = 64.45$ |
|   | $R_3 = 11.635$    |              |              |                |                  |
|   |                   |              | $S_2 = 20.756$ |                |                  |
|   | $R_4 = 41.480$    |              |              |                |                  |
|   |                   | $T_3 = 1.750$ |              | $ND_3 = 1.78446$ | $\nu_3 = 25.74$ |
| II | $R_5 = 18.070$   |              |              |                |                  |
|   |                   | $T_4 = 3.250$ |              | $ND_4 = 1.48743$ | $\nu_4 = 70.40$ |
|   | $R_6 = -17.045$   |              |              |                |                  |

The values of the objectives, as stated herein, are independent of normal manufacturing tolerances and may be modified with the scope of the invention as defined in the claims.

What is claimed is:

1. A microscope objective which has two elements aligned along an optical axis which comprises a biconcave negative doublet I and biconvex positive doublet II for the following optical parameters:

| Lens | Radius(R) | Thickness(T) | Spacing (S) | Index of Refraction(ND) | No.($\nu$) |
|---|---|---|---|---|---|
|   |                   |               | $S_1 = .24167B$ |                     |                    |
|   | $R_1 = -4.36334B$ |               |              |                     |                    |
|   |                   | $T_1 = .04651B$ |              | $1.77 < ND_1 < 1.79$ | $\nu_1 \approx 25$ |
| I | $R_2 = -.25721B$  |               |              |                     |                    |
|   |                   | $T_2 = .04070B$ |              | $1.51 < ND_2 < 1.53$ | $\nu_2 \approx 64$ |
|   | $R_3 = .27059B$   |               |              |                     |                    |
|   |                   |               | $S_2 = .48271B$ |                     |                    |
|   | $R_4 = .96467B$   |               |              |                     |                    |
|   |                   | $T_3 = .04070B$ |              | $1.77 < ND_3 < 1.79$ | $\nu_3 \approx 25$ |
| II | $R_5 = .42024B$  |               |              |                     |                    |
|   |                   | $T_4 = .07558B$ |              | $1.48 < ND_4 < 1.50$ | $\nu_4 \approx 70$ |
|   | $R_6 = -.39640B$  |               |              |                     |                    | wherein B is equal to 41 to 45mm.

2. The microscope objective of claim 1 wherein B is equal to 43mm, $ND_1 = 1.78446$; $ND_2 = 1.51867$; $ND_3 = 1.78446$ and $ND_4 = 1.48743$ and $\nu_1 = 25.74$; $\nu_2 = 64.45$; $\nu_3 = 25.74$ and $\nu_4 = 70.40$.

* * * * *